United States Patent [19]

Pryor

[11] Patent Number: 4,570,065
[45] Date of Patent: Feb. 11, 1986

[54] ROBOTIC COMPENSATION SYSTEMS

[76] Inventor: Timothy R. Pryor, Diffracto, 2775 Kew Dr., Windsor, Ontario, Canada, N8T 3B7

[21] Appl. No.: 462,128

[22] Filed: Jan. 28, 1983

[51] Int. Cl.⁴ .............................................. G01D 5/34
[52] U.S. Cl. ................ 250/231 R; 250/561; 901/47
[58] Field of Search ............... 250/201, 231 R, 23 SE, 250/227, 203 R, 561; 901/47; 73/800, 862.04, 655, 517 R, 518, 705; 340/685

[56] References Cited

U.S. PATENT DOCUMENTS

| 3,476,481 | 11/1969 | Lemelson | 250/559 |
| 3,715,599 | 2/1973 | Marcy | 250/231 R |
| 3,921,445 | 11/1975 | Hill et al. | 73/862.04 |
| 4,405,231 | 9/1983 | Shemyakin et al. | 73/800 |
| 4,452,506 | 6/1984 | Reeve et al. | 250/227 |
| 4,466,189 | 8/1984 | Tobin | 250/231 SE |

Primary Examiner—David C. Nelms
Attorney, Agent, or Firm—Larson and Taylor

[57] ABSTRACT

Optical compensation systems are provided which compensate for deflections of the articulated sensor arm of a robotic inspection apparatus such as are produced under load. A light source located at the distal end of the arm produces a light zone, such as a "spot", which is coupled through the pivot joints to an electro-optical detector array or other light position sensor. Coupling through the joints is provided by fiber optic bundles which extend through the joints and whose ends are supported centrally within the arm sections to respectively pick up and transmit the detected "spot". The positional information from the detector is used to upgrade the positional data provided by optical encoders located at the joints.

20 Claims, 5 Drawing Figures

TO SIGNAL PROCESSOR

TO COMPUTER

ROBOTIC COMPENSATION SYSTEMS

FIELD OF THE INVENTION

The present invention relates to robotics and, more particularly, to compensation systems for robotic inspection apparatus.

BACKGROUND OF THE INVENTION

The revolution in the use of robots in industry for many different purposes is well publicized. Articulated robot arms have been used extensively in performing many tasks including measurement and/or inspection of parts. Rotational encoders located at the joints of the articulated arm are used to determine the position of the distal end of the robot arm, which, typically carries a part to be assembled or handled. There are serious accuracy limitations on the rotational encoders available in the prior art and with the increasing demands for more and more accurate readings particularly in the assembly or inspection of finished parts, a definite need exists for improving the accuracy of the measurements provided by the encoder arrangements of existing robotic apparatus.

SUMMARY OF THE INVENTION

In accordance with the present invention, an optical compensating system is provided for robot apparatus employing a moveable robot arm or like moveable member whose position is to be accurately determined so that, for example, the end position of an articulated arm relative to a part under inspection can be accurately determined. Generally speaking, one aspect of the invention concerns the generation of a light spot whose position, relative to a reference position, as detected by a light detector, is related to the deflection or deviation of the robot arm from the desired position.

Although as discussed in more detail below, an external light source can be used, in one preferred embodiment the light source is located at the distal end of the robot arm and the detector located in a position to detect any deviation from a reference location of the light spot imaged thereon caused by deflection of the arm, e.g., because of loading thereof. It will be understood that the position of the light source and detector can be reversed, in which case deflection of the distal end of the robot arm will result in displacement of the detector so that the light spot is imaged at a different location thereon. A very important feature of these embodiments of the invention involves the use of fiber optics to provide coupling of the light signal through the pivot joint between the light source and detector. Advantageously, the distal ends of the fiber optic bundle are supported within the robot arm so as to be positioned appropriately with reference to the light source and detector, and a series of lenses is used in properly imaging the light signal. In a typical practical embodiment, the robot arm includes a plurality of joints and individual fiber optic bundles are used at each joint so as to form a "train" between the detector and light source. In such an arrangement, if a single detector is used the output thereof will be a function of the total deflection of all of the arm sections. Alternatively, a separate source and detector can be used for each arm section.

Other features and advantages of the present invention are set forth in, or will be apparent from, the detailed description of preferred embodiments of the present invention found hereinbelow.

DETAILED DESCRIPTION OF THE PREFERRED EMBODIMENTS

Figure 1:
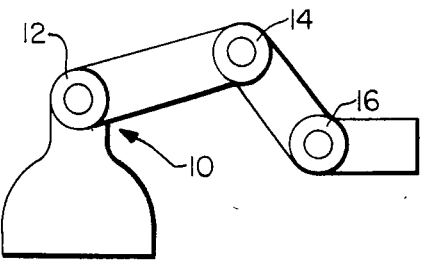
FIG. 1 is a schematic side elevational view of an articulated robot arm.

Referring to FIG. 1, there is shown a typical articulated robot arm 10, i.e., a robot arm referenced to angular or polar coordinates, and including rotational encoders located at joints 12, 14 and 16 of robot arm 10.

Figure 2:
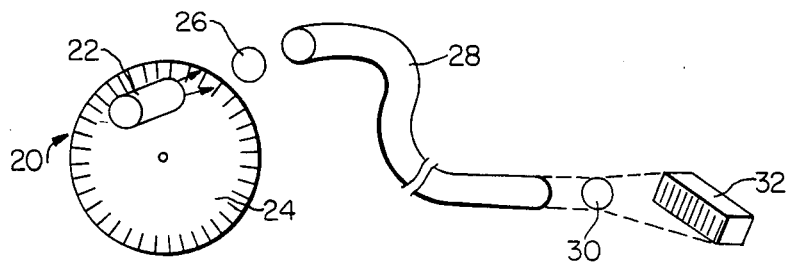
FIG. 2 is a schematic perspective view of a rotary encoder suitable for use in the embodiment of FIG. 1.

The encoders are preferably (but not necessarily) of the form illustrated in FIG. 2 and of a general type described in more detail in my concurrently filed, co-pending application Ser. No. 462,127, entitled PULSED ROBOTIC INSPECTION. As illustrated, the encoder, which is generally denoted 20, includes a light source 22, a rotational scale 24, and a focusing lens 26. Scale 24 is typically divided into 720 scale divisions over 360° and lens 26 forms an image thereof at one end of a bundle of a coherent optical fibers denoted 28. The image transmitted through bundle 28 is focused by a further lens 30 onto a diode detector array 32. Thus, rotary movement of the scale lines of scale 24 is detected by detector array 32 and a corresponding electrical output is produced thereby.

In the specific embodiment under consideration, the diode array images are actually transmitted by means of optical fibers to a central array which reads the encoder scales for all three joints, only one joint being shown for purposes of clarity. The purpose here is to determine the position of the joint encoders in an absolute fashion thereby eliminating the ambiguity in robots which repeat functions but do not provide the required accuracy.

Figure 3:
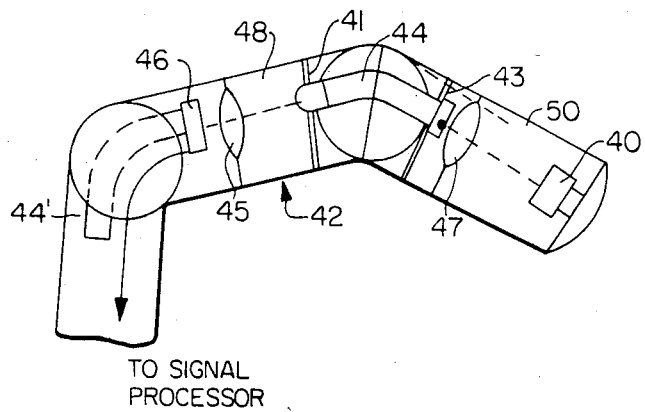
FIG. 3 is a schematic cross sectional view of a robot arm incorporating the optical compensation system of the invention.

In order to further compensate such robots for inertial deflections and, more importantly, for gravitational or inertial deflections with varying loads, a robot system is provided, which is illustrated in FIG. 3, that utilizes as one of its key elements, the provision of light transmitting fiber optic bundles in each of the joints thereof. In the embodiment illustrated in FIG. 3, light from a laser diode 40, or a fiber optic point source or other similar device is located at one end of a robot arm 42 similar to that shown in FIG. 1. The beam from laser diode 40 is focused as a "spot" on the end of a coherent fiber optic bundle 44 located in the most distal joint 42a of arm 42. An image of this "spot" (or other suitable zone of light) is transmitted from the other end of the fiber optic bundle 44 to a diode array detector 46, or like spot image sensor, which senses the position of the spot. Plates 41 and 43 are utilized to fix and center the positions of the ends of fiber optic bundle 44 and lenses 45 and 47 are also mounted with the robot arm sections 48 and 50 to provide appropriate imaging of the spot.

Figure 4:
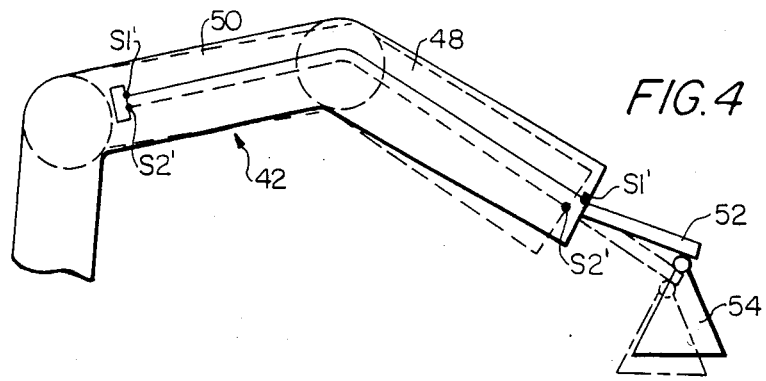
FIG. 4 is a simplified schematic cross sectional view of the robot arm of FIG. 3, illustrating the results of deflection of the arm under load.

It will be understood that the showing in FIG. 3 has been simplified for purposes of clarity, Typically, a plurality of separate optical fiber bundles would be used corresponding to the number of joints, with the "spot" or other zone image being focused onto one end of the fiber bundle at each joint and the emitted "spot" at the other end of the fiber bundle on the other side of the joint being, in turn, focused on the fibers of the next joint, and so on, until the image of the spot is focused on a detector which senses the spot position. Thus, in a multiple jointed arm such as these considered above, a further fiber optic bundle indicated at 44 would be located at the end of the optical train. If there is no deflection of any of the structural members forming the robot arm, i.e., no deflection of members 48 and 50 of FIG. 2, the spot will be located in the center of detector 46 or in another nominal reference position. This nominal position is that at which the computer control system for the joint encoders assumes the end portion of the robot arm to be located.

Where a deflection occurs which is of a type which is not registered by the encoders as a rotation, the position of the spot will change from the nominal position. This is illustrated in FIG. 4 wherein the initial position of the spot is indicated at S1 and the detected image thereof at S1', and the deflected spot, produced when the robot arm is deflected (for example, by grippers 52 picking up a load 54), is indicated at S2 and the image thereof at S2'. It is noted that because the spot image is normally transmitted through a "train" of joints, e.g., three joints in sequence in the embodiment of FIG. 1, any change in spot position is a function of the deflections of all of the structural members, i.e., of both arm members or sections 48 and 50 in FIG. 3. This may or may not be desirable depending on precisely how the deflections occur. For example, in the illustrated embodiment it will be evident that, under the load of a weight carried by the robot arm and with extension of the arm, the deflections of all sections of the arm will be in the downward direction and thus the sum of all such deflections can be directly detected and read. Typically, the detector used (i.e. the detector corresponding to detector 46) comprises a photodiode detector array or an analog spot position detector such as a UDT SC-10. The latter is a dual axis detector as are matrix diode arrays such as the GE TN 2500, and it is noted that, in general, the robot arm, and thus the "spot" or other zone of light can be deflected in any direction. However, as noted above, the zone will typically be deflected downwardly or upwardly in response to changes in the gravitational forces on the arm.

In use, the readout produced by detector 46 is compared by a computer (not shown) with the outputs of the encoders and appropriate compensation made in the position of the robot arm relative to the assumed position thereof.

One technique for projecting the laser "spot" is simply to image a point source. Such a point source could be produced by the laser used but with the laser beam diverged rather than projected. It is also noted that in an alternative embodiment the point source, corresponding to source 40 of FIG. 3, could be located at the base of the robot with detection being provided at the distal end of the robot, i.e., in a sequence that is the reverse of that illustrated in FIG. 3.

The above describes imaging, for example, with lens 47 located near the fiber bundle end, a point light source or other zone such as a backlit reticle plate not shown. It is also possible in this invention to use a projected collimated beam as from a laser such as 40 directly onto the detector or fiber bundle end without use of a lens to form an image of the zone. In this case, angular deflections are magnified and this can be advantageous in certain applications. This arrangement is further illustrated in FIG. 5.

Figure 5:
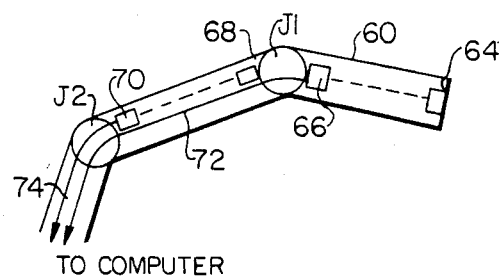
FIG. 5 is a schematic cross sectional view of a further embodiment of the optical compensation system of the invention.

In a further embodiment illustrated in FIG. 5, each joint J1, J2 etc. is monitored independently of the other joints by providing each of the arm sections, denoted 60 and 62, with a light spot projector-detector combination. Thus, in the illustrated embodiment, section 60 includes a projector 64 and a detector 66 and section 62 includes a projector 68 and a detector 70. The outputs of detectors 66 and 70 are fed by suitable connectors 72 and 74 to a computer (not shown) and the combination of the individual deflections will equal the total deflection. This approach could have advantages in situations where independent monitoring of the positions of the individual sections was required for any purpose. Further, as long as the deflections are purely dimensional and not angular, the lengths of the arm sections, and other such dimensions, do not have to be known. However, if the monitored variable is angled, as might be the case with a collimated diode laser projection system, the length of the arm must be taken into consideration and each joint monitored individually. This can be readily accomplished by picking off the output of the detector unit at each joint with a fiber optic bundle individual to that unit. Fiber optic techniques can be used to provide remote light sources (e.g., "pigtail" type diode lasers).

The system of the invention can also be implemented using an external light source to provide the input light beam to the arm. For example, this could be done by providing for generation of a special projection spot when the robot passes over a calibration point. This spot would be utilized throughout the total arm system and permit each joint to be separately calibrated. Ideally, calibration spots would be projected from more than one direction (e.g., 90° orthogonal, horizontal and vertical) to permit calibration in each axis.

The word light spot used herein generally refers to a single circular zone of light, UV, visible or infra red. While this is the generally preferred type of light zone useable with the invention, it is also considered that other such zones can be projected or imaged to fulfill the requirements of accurate position detection. For example, lines or veticle shaped zones may be so imaged or projected.

It is also possible to use single mode lens-like fibers such as a selfoc long laser guide, rather than coherent bundles. The term fiber optic light guide is defined as any fiber optic capable of transmitting a sufficiently undistorted pattern of light from one end to another.

Although the invention has been described relative to exemplary embodiments thereof, it will be understood by those skilled in the art that variations and modifications can be effected in the exemplary embodiments without departing from the scope and spirit of the invention.

I claim:

1. In a robot apparatus comprising a movable robot arm including at least one pivot joint, the improvement comprising means for generating a light zone within said arm on one side of said joint, detector means located within said arm on the other side of said joint for detecting the position of the zone relative to a reference position corresponding to a first position of said arm and imaging means for light coupling said zone through said joint to said detector means such that displacement of the zone from said reference position as detected by said detector means is a measure of the deflection of said arm from said first position.

2. A robot apparatus as claimed in claim 1 wherein said robot arm has a distal end and a proximal end and said light zone generating means is located at the distal end of said robot arm so as to be movable therewith.

3. A robot apparatus as claimed in claim 2 wherein said light coupling means includes a flexible fiber optic light guide which extends through said joint, one end of said fiber optic light guide being positioned to receive an image of the light zone generated by said light zone generating means.

4. A robot apparatus as claimed in claim 3 further comprising means located on opposite sides of the joint for supporting the ends of said fiber optic light guide in predetermined positions within the robot arm.

5. A robot apparatus as claimed in claim 4 wherein said supporting means comprises a pair of mounting plates in which the ends of the fiber optic light guide are supported.

6. A robot apparatus as claimed in claim 5 wherein said light coupling means further comprises a lens located within said arm for imaging said light zone.

7. A robot apparatus as claimed in claim 1 wherein said light coupling means comprises at least one lens located within said arm for providing imaging of said zone on said detector means.

8. A robot apparatus as claimed in claim 1 wherein said robot apparatus includes a rotary encoder located at said pivot joint for determining the angular position of one arm section of the robot arm on one side of said joint relative to a further arm section of the robot arm on the other side of the joint and wherein the output of said detector means is fed to a computing means for correcting the output produced by said rotary encoder.

9. A robot apparatus as claimed in claim 8 wherein said rotary encoder includes a circular rotary scale with scale markings around the periphery thereof, a detector array and a light source for imaging the scale onto the detector array.

10. A robot apparatus as claimed in claim 9 further comprising a fiber optic means for coupling said image of the scale to said detector array.

11. A robot apparatus as claimed in claim 1 wherein said robot arm comprises a plurality of articulated sections, and a said light zone generating means and a said detector means are located at the opposite ends of each section.

12. A robot apparatus as claimed in claim 11 wherein means are provided for electrically coupling the outputs of each of the detectors through the joints to computing means for combining said outputs.

13. In robotic apparatus employing an articulated robot arm having at least one joint located between adjacent arm sections, the improvement comprising measurement compensating apparatus, including a light source and a light detector located within said arm, arranged such that deviations from a reference position of the light beam produced by the light source as detected by the light detector are a measure of the deflection of the robot arm, and fiber optic means for coupling light from the light source to the light detector through said joint.

14. Robot apparatus as claimed in claim 13 wherein said light source comprises a point source and said light detector comprises a photodiode array.

15. Robot apparatus as claimed in claim 13 wherein said robot arm includes a plurality of said joints, and said light source and said light detector are positioned at opposite ends of said robot arm.

16. Robot apparatus as claimed in claim 13 wherein said fiber optic means comprises a fiber optic bundle extending through said joint and having the opposite ends thereof supported in reference positions within said robot arm relative to said light source and light detector.

17. Robot apparatus comprising an articulated robot arm comprising at least one joint, a rotary encoder located at said joint for providing an output related to the relative angular position of the arm sections on either side of the joint, a light source and an electro-optical light detector arranged relative to said robot arm so as to detect deflections of said robot arm, said light detector producing an output, related to the deflection of said robot arm relative to a reference position, for correcting the output provided by said rotary encoder for deflections of said arm.

18. Robot apparatus as claimed in claim 17 wherein said source and detector are located within said arm, said apparatus further comprising fiber optic means extending through said joint for guiding light from said light source to the light detector.

19. Robot apparatus as claimed in claim 18 wherein said fiber optic means comprises a filter optic bundle, said apparatus further comprising means for supporting the opposite ends of said fiber optic bundle in reference positions, on either side of said joint relative to said light source and said light detector.

20. A robot apparatus comprising a movable robot arm comprising a plurality of articulated joints;
 a rotary encoder located at each of said joints and;
 a single optical detector; and
 fiber optic coupling means for transmitting an image of the outputs of each of said rotary encoders to said single optical detector.

* * * * *